United States Patent [19]

Kimura

[11] Patent Number: 5,574,606

[45] Date of Patent: Nov. 12, 1996

[54] MAGNETIC HEAD HAVING DUST HANDLING TAPE SLIDE SURFACE

[75] Inventor: Takeshi Kimura, Chichibu, Japan

[73] Assignee: Canon Denshi Kabushiki Kaisha, Chichibu, Japan

[21] Appl. No.: 422,651

[22] Filed: Apr. 14, 1995

Related U.S. Application Data

[63] Continuation of Ser. No. 111,394, Aug. 25, 1993, abandoned, which is a continuation of Ser. No. 832,618, Feb. 11, 1992, abandoned, which is a continuation of Ser. No. 488,725, Feb. 27, 1990, abandoned.

[30] Foreign Application Priority Data

| Feb. 28, 1989 | [JP] | Japan | 1-048916 |
| Feb. 28, 1989 | [JP] | Japan | 1-048917 |
| May 19, 1989 | [JP] | Japan | 1-126384 |
| May 19, 1989 | [JP] | Japan | 1-126385 |
| May 19, 1989 | [JP] | Japan | 1-126386 |

[51] Int. Cl.⁶ ............... G11B 15/60; G11B 5/187; G11B 5/105

[52] U.S. Cl. .............. 360/130.21; 360/122; 360/129

[58] Field of Search ............... 360/130.21, 130.2, 360/129, 128, 122, 125, 119, 110, 130.31, 130.3

[56] References Cited

U.S. PATENT DOCUMENTS

| 3,435,442 | 3/1969 | Ma et al. | 360/102 |
| 3,643,037 | 2/1972 | Norwood | 360/102 |
| 4,322,764 | 3/1982 | Tanaka | 360/122 |
| 4,485,420 | 11/1984 | Schoenmakers | 360/130.21 |
| 4,750,066 | 6/1988 | Kunze | 360/130.3 |
| 4,757,411 | 7/1988 | Matsunaga | 360/129 |
| 4,888,657 | 12/1989 | Lacey et al. | 360/122 |
| 4,894,737 | 1/1990 | Hamana et al. | 360/130.21 |
| 4,926,278 | 5/1990 | Shoenmakers | 360/130.21 |
| 4,956,737 | 9/1990 | Brock | 360/122 |
| 4,962,438 | 10/1990 | Kunze | 360/129 |
| 5,016,132 | 5/1991 | Okuda et al. | 360/130.2 |
| 5,065,500 | 11/1991 | Yoneda et al. | 360/103 |
| 5,124,866 | 6/1992 | Rothermel | 360/125 |

FOREIGN PATENT DOCUMENTS

| 97975 | 1/1984 | European Pat. Off. | 360/122 |
| 0120518 | 11/1987 | European Pat. Off. | |
| 337 566 | 10/1989 | European Pat. Off. | |
| 35 18 126 | 7/1986 | Germany . | |
| 53-020917 | 7/1978 | Japan | 360/121 |
| 54-049104 | 4/1979 | Japan | 360/102 |
| 57-200922 | 12/1982 | Japan | 360/122 |
| 58-080122 | 5/1983 | Japan | 360/125 |
| 58-088824 | 5/1983 | Japan | 360/121 |
| 58-088825 | 5/1983 | Japan | 360/121 |
| 60-191403 | 9/1985 | Japan | 360/129 |
| 60-223013 | 11/1985 | Japan | 360/122 |
| 61-48110 | 3/1986 | Japan | 360/122 |
| 61-54011 | 3/1986 | Japan | 360/122 |
| 61-187150 | 8/1986 | Japan . | |
| 61-216103 | 9/1986 | Japan | 360/122 |
| 61-214109 | 9/1986 | Japan | 360/122 |
| 63-133309 | 6/1988 | Japan . | |
| 1-35710 | 2/1989 | Japan | 360/122 |
| 0317261 | 12/1989 | Japan | 360/130.21 |
| 415708 | 10/1974 | U.S.S.R. | 360/129 |
| 595775 | 2/1978 | U.S.S.R. | 360/122 |
| 1527661 | 12/1989 | U.S.S.R. | 360/125 |
| 998438 | 7/1965 | United Kingdom | 360/122 |

OTHER PUBLICATIONS

"Channeled Magnetic Head", Magura, IBM Technical Disclosure Bulletin, vol. 4, No. 2, Jul. 1961, p. 33.

*Primary Examiner*—Stuart S. Levy
*Assistant Examiner*—Craig A. Renner
*Attorney, Agent, or Firm*—Spencer & Frank

[57] ABSTRACT

A magnetic head for writing and/or reading out data into and/or from a magnetic tape has surfaces defining a reference plane for determining a position of an edge of a traveling magnetic tape and defining an inclined plane for urging the magnetic tape to the reference plane, and a tape travel surface defined between the reference and inclined planes. A recess is formed at a portion of the tape travel surface extending along at least one edge of the magnetic tape.

4 Claims, 14 Drawing Sheets

MAGNETIC HEAD HAVING DUST HANDLING TAPE SLIDE SURFACE

This application is a Continuation, of application Ser. No. 08/111,394, Filed Aug. 25, 1993, (now abandoned) which is a continuation of application Ser. No. 07/832,618 filed Feb. 11, 1992 (now abandoned), which is a continuation of application Ser. No. 07/488,725, filed Feb. 27, 1990 (now abandoned).

BACKGROUND OF THE INVENTION

1. FIELD OF THE INVENTION

The present invention relates to a magnetic head and more particularly a magnetic head for writing and reading out data into and/or from a magnetic tape in magnetic recording apparatuses such as video tape recorders, audio tape recorders and the like.

2. DESCRIPTION OF THE PRIOR ART

A prior art magnetic head similar to the magnetic head disclosed in U.S. Pat. No. 4,485,420 or E.P. 0120518B1 is shown in FIGS. 1, 2 and 3. FIG. 1 illustrates a cross-sectional view, a part of which is omitted, taken along the longitudinal direction of travel of the magnetic tape over the magnetic head; FIG. 2 is a top view thereof; and FIG. 3 is a side view thereof. Reference numeral 1 is a case which is one of the component parts of the magnetic head and is made of a magnetic shielding material. A gap 3 is formed in a portion of a core 4 which contacts the magnetic tape. The core 4 is embedded in the case 1 by a resin 7. Tape guides 6 and 6' are provided on both sides of the case 1, respectively, in the longitudinal direction of travel of the magnetic tape.

The magnetic tape 5 is traveling over the upper surface of the magnetic head by which data is written into and/or read out from the magnetic tape 5. Concave portions 8 and 8' are formed at a portion of the upper surface of the magnetic head to which the resin 7 is exposed to prevent the magnetic tape 5 contacting the resin 7, so that deboning of magnetic particles from the magnetic tape 5 is prevented. As a result, the tape travel surfaces defined on the upper surface of the magnetic head are represented by 2a, 2b and 2b'.

It is now assumed that the magnetic tape 5 is traveling in the direction indicated by the arrow A in FIG. 2. Then the magnetic tape 5 comes into contact with the inclined plane formed on a projection 6b of the tape guide 6 and is biased to the reference plane formed on a projection 6a. As best shown in FIG. 3, the width of the magnetic tape traveling passage defined between the inclined plane and the reference plane is narrower than the width of the magnetic tape 5 and tension is exerted on the magnetic tape 5. Therefore, in order to ensure smooth travel over the surface of the magnetic head, the positions of the magnetic tape 5 in the direction of its thickness must be limited so that a bottom plane 6c is provided with between the projection 6a and 6b. The reference plane is substantially perpendicular to the bottom plane (to be referred to as the position control plane) 6c so that one side edge of the magnetic tape 5 travel along the reference plane. The reference planes defined on the projections 6a and 6a' are substantially perpendicular to the direction in which the gap 3 is extended so that the position of travel and the longitudinal direction of the magnetic tape 5 can be stabilized. As a result, the so-called gap angle between the tape 5 and the gap 3 can be maintained constant so that the azimuth loss due to the difference in the gap angle between a writing mode and a reading mode can be reduced.

In general, the tape guides are formed by injection molding of a plastic material which is inexpensive, thereby reducing the production cost, but almost all the tape guides thus fabricated have rough surfaces. As a result, due to the contact of the magnetic tape 5 with the bottom planes 6c and 6c' of the tape guides 6 and 6', it occurs frequently that the magnetic material and the binder of the magnetic tape 5 are separated.

In the case of the magnetic head of the type described above, the radius of curvature of the tape travel surface defined by the travel surfaces 2a, 2b and 2b' is relatively small and furthermore the bottom planes 6c and 6c' of the tape guides are more extended than the tape travel surfaces 2b and 2b'. Therefore, the passage of tape travel is located on the line interconnecting the bottom planes 6c and 6c' of the tape guides 6 and 6' and the top of the travel surface 2a containing the gap 3. It follows therefore that the magnetic tape 5 is barely in contact with the tape travel surfaces 2b and 2b'. However, when the magnetic head is used for a long time under the above-described conditions, dust such as magnetic particles and binder particles of the magnetic tape 5 separated at the bottom plane 6c and 6c' of the tape guides 6 and 6' attaches to the magnetic tape 5, is transported to the vicinity of the gap 3 and adheres there. As a result, such dust adversely affects the predetermined distance between the gap 3 and the magnetic tape 5 so that it becomes one of the causes of degradation of the writing and reading characteristics of the magnetic head.

In general, the adhesion or accumulation of such dust tends to occur at high temperatures so that the magnetic head of the type described above cannot be used in stereophonic audio equipment mounted in a car whose temperature becomes relatively high.

FIG. 4, 5 and 6 illustrate another prior art magnetic head. FIG. 4 is a top view thereof; FIG. 5 is a front view thereof and FIG. 6 is a perspective view thereof. Like reference numerals are used to designate similar parts in both the magnetic heads illustrated in FIGS. 1–3 and 4–6 and the description of the component parts already made with reference to FIGS. 1–3 shall not be repeated. It should be noted here that in the second prior art magnetic head, the tape guides are not illustrated.

In the second prior art magnetic head, the length of the magnetic core 4 perpendicular to the longitudinal direction of magnetic tape 5 is designed to be shorter than the width of the magnetic tape 5. For instance, while the length of the magnetic core 4 is 3.72±0.05 mm, the width of the magnetic tape 5 is 3.81−0.05 mm to 3.81+0 mm so that over the surface 2a the magnetic tape 5 and the resin 7 come into contact with each other by the designation width of 0.09 mm.

As described above, because of the contact between the magnetic head and the magnetic tape, dust such as magnetic particles and binder particles tend to be separated from the resin 7 so that the dust particles are transported by the magnetic tape 5 and accumulate at the tape travel surfaces 2b and 2b'. In the case of the second-mentioned prior art magnetic head, the accumulation or adhesion of such dust particles is concentrated at the portions of the tape travel surface 2b or 2b' corresponding to both side edges of the magnetic tape 5 so that a thin dust film is formed between the magnetic tape 5 and the travel surface 2b or 2b'. As the result, a degree of wear at the portion at which such dust film is formed on the tape travel surface 2b or 2b' is different from the wear at the portion corresponding to the center portion of the magnetic tape 5 at which no dust adhesion or accumulation occurs. In general, the tape travel surfaces 2b and 2b' across the whole width of the magnetic tape 5 should be worn uniformally, but in practice because of the nonuniform wear described above, there arises the problem that the position of travel of the magnetic tape 5 cannot be uniformly maintained.

The resin 7 becomes a source from which dust particles are produced and such dust particles thus produced tend to adhere to the resin 7 as opposed to the tape travel surfaces. As a result, however the area of contact between the magnetic film 5 and the resin 7 is small, for instance, when the dust particles adhere to the resin 7 in the tape travel surface, the dust particles grow from the first adhered dust particle as a nucleus. Sometimes, such growing of dust particles prevents the smooth travel of the magnetic tape.

SUMMARY OF THE INVENTION

In view of the above, one of the objects of the present invention is to provide a magnetic head which can reduce the separation of dust particles from the magnetic tape and in which even when the dust particles are produced, the partial accumulation or adhesion of the dust particles over the tape travel surface and the portions in the vicinity of the gap can be prevented so that the smooth travel of the magnetic tape can always be ensured and therefore degradation of the writing and reading characteristics can be prevented.

According to one aspect of the present invention, a magnetic head for writing and/or reading data into and/or from a magnetic tape comprises:

a magnetic core;

reference plane for determining a position of an edge of the magnetic tape;

an inclined plane, defined in a correspondent position to the reference plane in a longitudinal direction of the magnetic tape, for urging the magnetic tape to the reference plane; and a tape travel surface over which the magnetic tape travels and which is provided with a magnetic gap, the travel surface including a first tape travel surface section defined at a correspondent position to the reference plane and the inclined plane in the longitudinal direction of the magnetic tape and a second tape travel surface section defined at a different position in the longitudinal direction of the magnetic tape from the first tape travel surface section, the first tape travel surface section being aligned with the second tape travel surface section in a thicknesswise direction of the magnetic tape.

According to another aspect of the present invention, a magnetic head for writing and/or reading data into and/or from a magnetic tape comprises:

a magnetic core;

a case member for holding the magnetic core, having a tape travel surface over which the magnetic tape travels on the upper surface thereof; and a guide member having a reference plane for determining a position of the magnetic tape in a direction of a width thereof, a inclined plane defined in a correspondent position to the reference plane in a longitudinal direction of the magnetic tape for urging the magnetic tape to the reference plane, and a bottom plane defined between the reference plane and the inclined plane, and aligned with the tape travel surface in a thicknesswise direction of the magnetic tape.

According to further aspect of the present invention, a magnetic head for writing and/or reading data into and/or from a magnetic tape comprises:

a magnetic core;

a case member fox holding the magnetic core, having a tape travel surface over which the magnetic tape travels on the upper surface thereof; and a guide member having a reference plane for determining a position of the magnetic tape in a direction of a width thereof, and a inclined plane defined in a correspondent position to the reference plane in a longitudinal direction of the magnetic tape for urging the magnetic tape to the reference plane, an end of the tape travel surface in the longitudinal direction of the magnetic tape being positioned between both ends of the inclined plane in the thicknesswise direction of the magnetic tape.

According to further aspect of the present invention, a magnetic head for writing and/or reading data into and/or from a magnetic tape comprises:

a magnetic core;

a case member for holding the magnetic core;

a fixing member for fixing the magnetic core into the case member, a tape travel surface over which the magnetic tape travels being defined by respective partial surfaces of the magnetic core, the case member and the fixing member, at least one recess being formed at a portion of the tape travel surface corresponding to at least one widthwise edge of the magnetic tape.

The objects effects, features and advantages of the present invention will become more apparent from the following description of embodiments thereof taken in conjunction with the accompanying drawings.

DETAILED DESCRIPTION OF PREFERRED EMBODIMENTS

Figure 1:
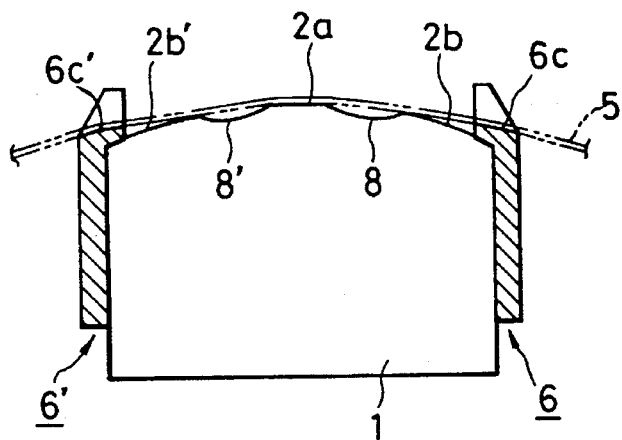
FIG. 1 is a cross-sectional view taken along the longitudinal direction of the magnetic tape illustrating a first prior art magnetic head.
Figure 2:
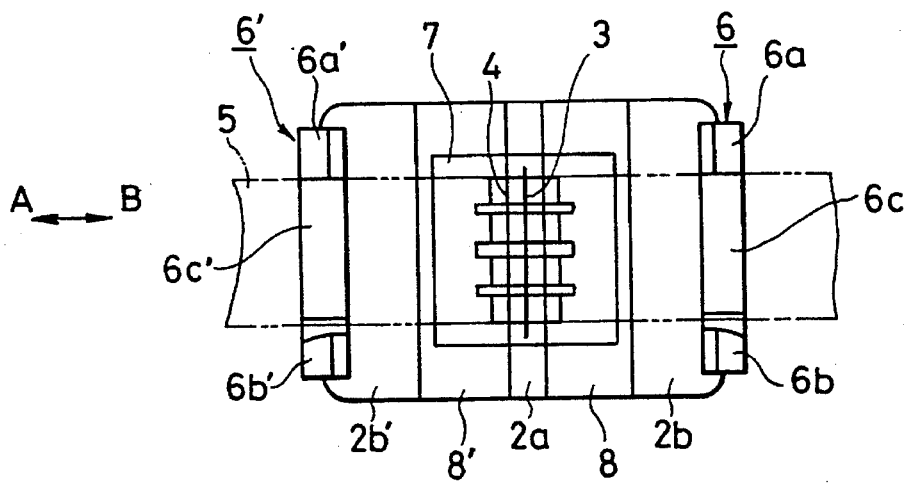
FIG. 2 is a top plan view of the magnetic head of FIG. 1.
Figure 3:
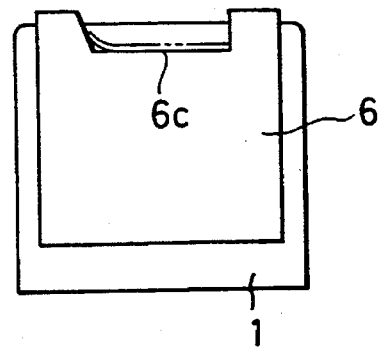
FIG. 3 is a side view of the magnetic head of FIGS. 1 and 2.
Figure 4:
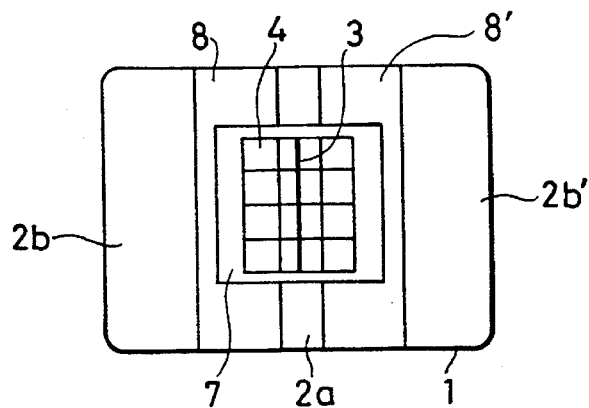
FIG. 4 is a top plan view of a second prior art magnetic head.
Figure 5:
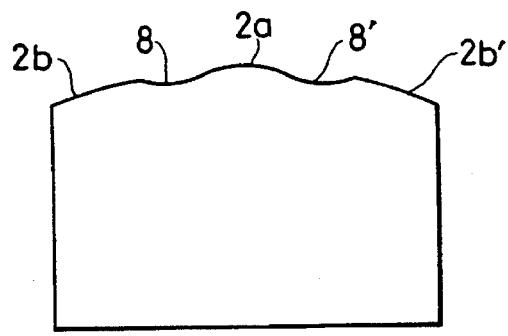
FIG. 5 is a front view of the magnetic head of FIG. 4.
Figure 6:
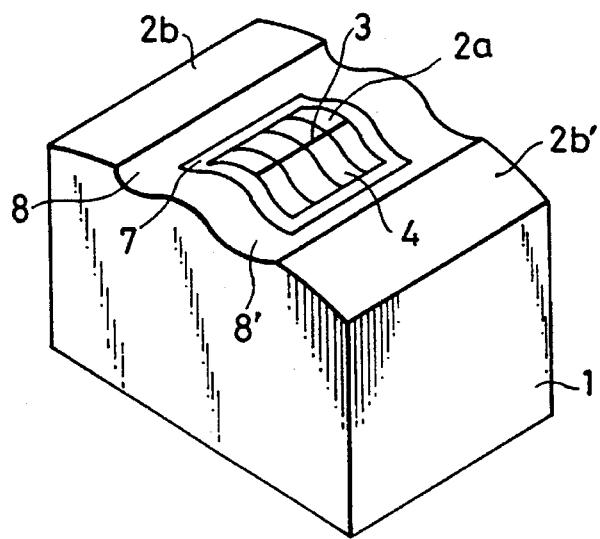
FIG. 6 is a perspective view of the magnetic head of FIGS. 4 and 5.

In the following embodiments and their modifications, like reference numerals are prefixed with the various numbers representing corresponding parts in the several views. For instance, the case designated by the reference numeral 1 in FIGS. 1–6 is changed to 11 in FIG. 7. These component parts have already been described in detail so that the component parts corresponding to those in FIGS. 1–6 shall not be described hereinafter except when their explanation is especially needed.

FIRST EMBODIMENT

Figure 7:
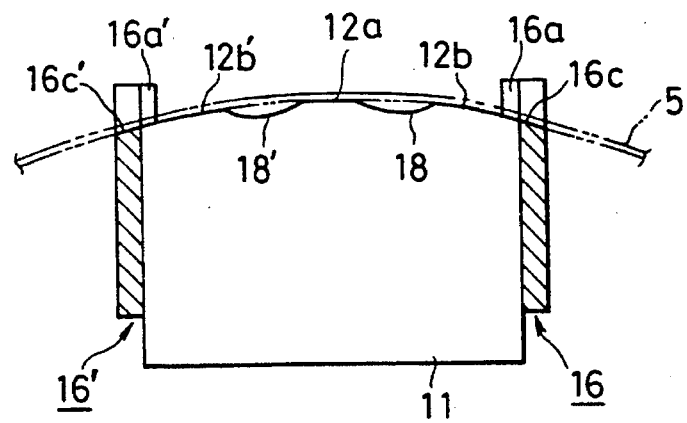
FIG. 7 is a cross-sectional view taken along the passage of a traveling magnetic tape illustrating a first embodiment of a magnetic head in accordance with the present invention.
Figure 8:
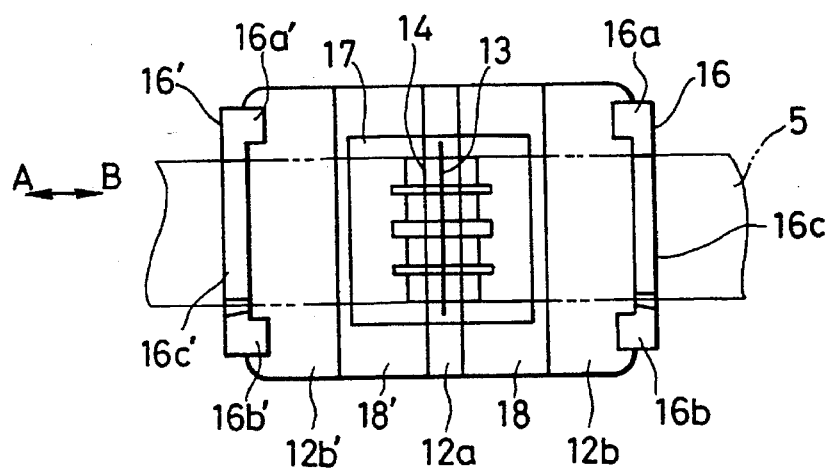
FIG. 8 is a top plan view of the magnetic head of FIG. 7.
Figure 9:
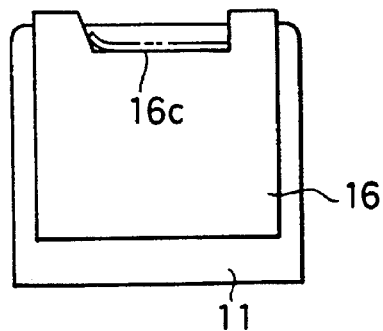
FIG. 9 is a side view of the magnetic head of FIGS. 7 and 8.

In the first embodiment shown in FIGS. 7–9, the radius of curvature of the type travel surfaces 12a, 12b and 12b' is made greater than those of the tape travel surfaces of the prior art magnetic heads described above. More particularly, when the radius of curvature of the tape travel surfaces in the prior art magnetic heads is between 10 and 15 mm, in the first embodiment, the corresponding radius of curvature is of the order of 20 mm. In this case, the radius of curvature of the curved surface interconnecting the tape travel surfaces 12a, 12b and 12b' is so determined that the bottom plane 16c and 16c' of the tape guides 16 and 16' are slightly extended beyond the curved surface interconnecting the tape travel surfaces.

When it is assumed that the magnetic tape 5 is traveling in the direction indicated by the arrow A in FIG. 8, because of the increase in radius of curvature of the curved surface interconnecting the tape travel surface 12a, 12b and 12b', in other words, the bottom plane 16c and the tape travel surface 12b, the bottom plane 16c' and the tape travel surface 12b' being substantially aligned with each other, first the magnetic tape 5 comes into contacts with the bottom 16c of the tape guide 16 so that the direction and position of the traveling magnetic tape can be correctly controlled. Thereafter the magnetic tape 5 comes into contact with almost all of the tape travel surface 12b. Then the dust particles produced at the bottom plane 16c are reattached to the magnetic tape 5 and almost all of them attach or adhere to the tape travel surface 12b. Therefore, there exists almost no chance that the dust particles will reach the tape travel surface 12a through which the magnetic gap 13 is defined. As a result, even when the magnetic head, is used for a long time under high temperature conditions, the degradation of writing and reading characteristics due to the adhesion or accumulation of dust in the vicinity of the magnetic gap can be prevented.

The travel surfaces 12b and 12b' are integrally formed with the case 11 which is made of a magnetic shielding material. This material, metal, is ground by a grinder or the like until the surfaces becomes so smooth that the roughness of the surface becomes in excess of 0.1 S. It follows therefore that at the travel surfaces 12b and 12b', the rate of production of dust such as magnetic particles and binder particles separated from the magnetic tape 5 is very low, and the rate of the adhesion or accumulation of dust is higher than that at the bottom surfaces 16 and 16c' of the tape guides 16 and 16', respectively.

The same is true when the magnetic tape 5 is traveling in the direction indicated by the arrow B in FIG. 8. That is, the dust particles produced at the bottom surface 16c' of the tap guide 16' almost all attach or adhere to the tape travel surface 12b' so that degradation of the magnetic characteristics due to the adhesion or accumulation of dust particles in the vicinity of the magnetic gap can be prevented.

In order to slightly extend upwardly the bottom surfaces 16c and 16c' of the tape guide 16 beyond the tape travel surfaces, precise position adjustment is required. Otherwise the above-described advantages cannot be satisfactorily attained. On the other hand, in accordance with the first embodiment, as best shown in FIGS. 7 and 8, the projections 16a and 16b of the tape guide 16 come into contact with the tape travel surface 12b on the side of the tape guide in assembly. The position of the position control plane 16c relative to the tape travel surface 12b can thus be correctly determined. In the same manner, the projections 16a' and 16b' of the tape guide 16' come into contact with the tape travel surface 12b' on the side of the tape guide in assembly. The position of the position control plane 16c' relative to the tape travel surface 12b' can thus be correctly determined.

MODIFICATION OF THE FIRST EMBODIMENT

Figure 10:
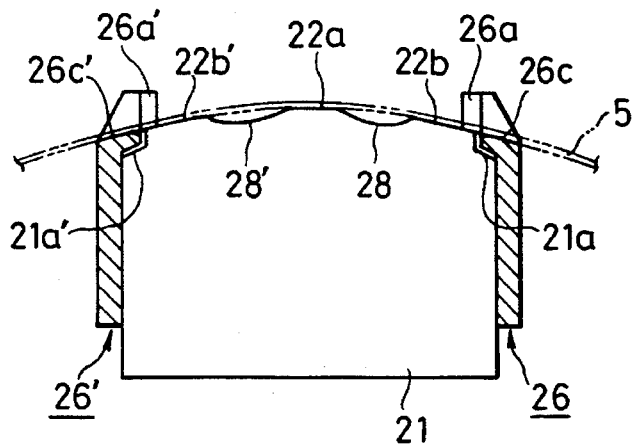
FIG. 10 is a cross-sectional view taken along the passage of the traveling magnetic tape illustrating a modification of the magnetic head of the first embodiment shown in FIGS. 7–9.
Figure 11:
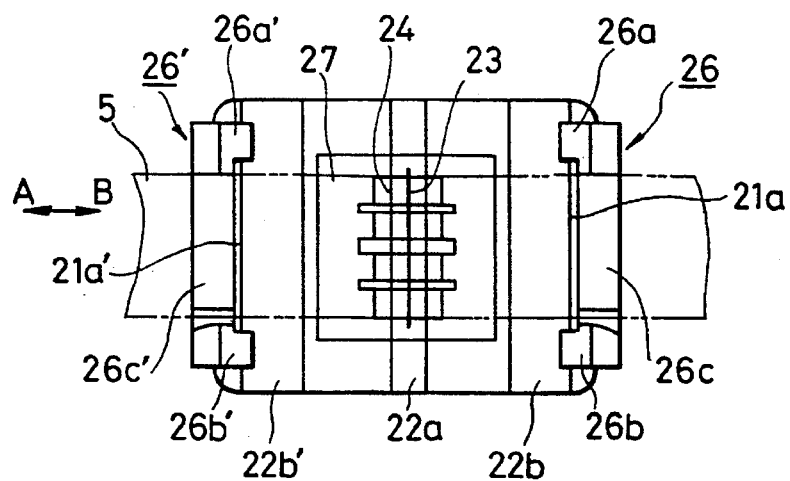
FIG. 11 is a top plan view of the magnetic head of FIG. 10.
Figure 12:
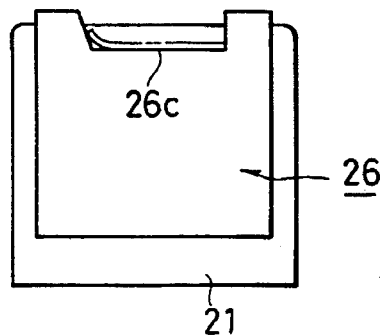
FIG. 12 is a side view of the magnetic head of FIGS. 10 and 11.
Figure 21:
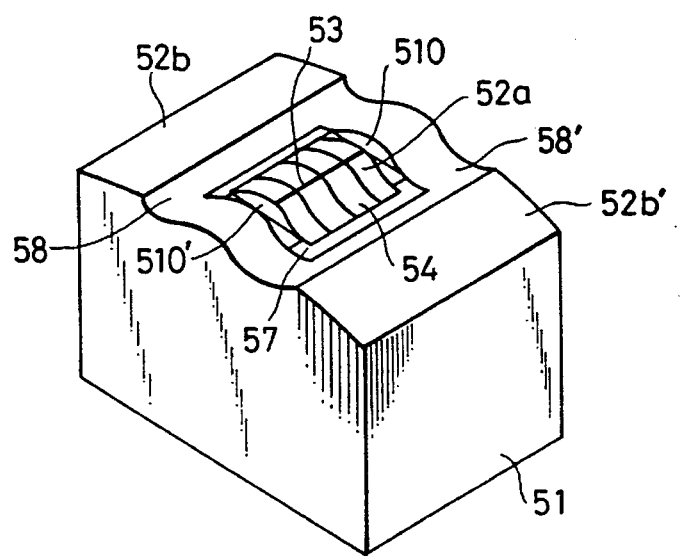
FIG. 21 is a perspective view of the magnetic head of FIGS. 19 and 20.

In the case of a modification of the first embodiment illustrated in FIGS. 10, 11 and 12, the radius of curvature of the tape travel surfaces and the positions of the bottom plane 26c and 26c' of the tape guide 26 are determined in a manner substantially similar to that described above in the first embodiment. In addition, as best shown in FIGS. 10 and 21, the upper portion of the case 11 is formed with cutout portions 21a and 21a' extended on the tape travel surfaces 22b and 22b' in the widthwise direction of the magnetic tape 5, i.e., from edge to edge, and the position control planes 26c and 26c' of the tape guides 26 and 26' are extended to the cutout portions or notches 21a and 21a' respectively When the length of the position control, planes 26c and 26c' along the longitudinal direction of the magnetic tape is increased, the pressure of contact between the position control planes 26c and 26c' and the magnetic tape 5 can be lowered so that the resistance to wear of the position control planes 26c and 26c' can be improved.

In the first embodiment and its modification, the position of the bottom planes relative to the tape travel surfaces and the radius of curvature of the tape travel surfaces are suitably determined as described above so that the magnetic tape is forced to come into contact with the inclined planes and the bottom planes of the tape guides and is forcibly biased satisfactorily toward the reference planes of the other projection, whereby the position and direction of the traveling tape can be stabilized.

Furthermore, in the case of the first embodiment and its modification, the dust particles produced at the bottom planes of the tape guides are forced to adhere to the tape travel surfaces on the side of the tape guides due to the suitable selection of the above-mentioned radius of curvature. Thus the dust particles almost uniformly adhere so that the position and the direction of the traveling tape will not be adversely affected.

SECOND EMBODIMENT

Next referring to FIGS. 13, 14 and 15, the second embodiment of a magnetic head in accordance with the present invention will be described. Recesses 39a, 39a', 39b and 39b' are formed at the area in the vicinity of the edges of the tape travel surfaces 32b and 32b', respectively, and the reference planes and inclined planes of the projections 36a, 36a' and 36b, 36b' of the tape guides 36 and 36' are defined within the recesses 39a, 39a', and 39b, 39b' respectively. In other words, the projections 36a, 36a', 36b and 36b' are extended by three to six millimeters from the magnetic gap 33 in the longitudinal direction of the tape, respectively. In the second embodiment, the reference planes and inclined planes of the projections intersect the tape travel surfaces 36b and 32b' through the recesses 39a, 39a' and 39b, 39b', respectively.

When the length of the magnetic head along the longitudinal direction of the tape is, for example, 11.4 mm and the quantity of the projection of the magnetic head is 1.8 mm in the second embodiment, the overall tape travel surface interconnecting the tape travel surfaces 32a, 32b and 32b' is so defined as to have a radius of curvature in excess of 20 mm. Thus, the magnetic tape 5, which is traveling, initially comes into contact with the tape travel surface 32b or 32b' at the edge thereof on the side of the tape guide, that is, at the tape travel surface 32b or 32b' between the projection 36a and 36b or between the projections 36a' and 36b'.

Figure 14:
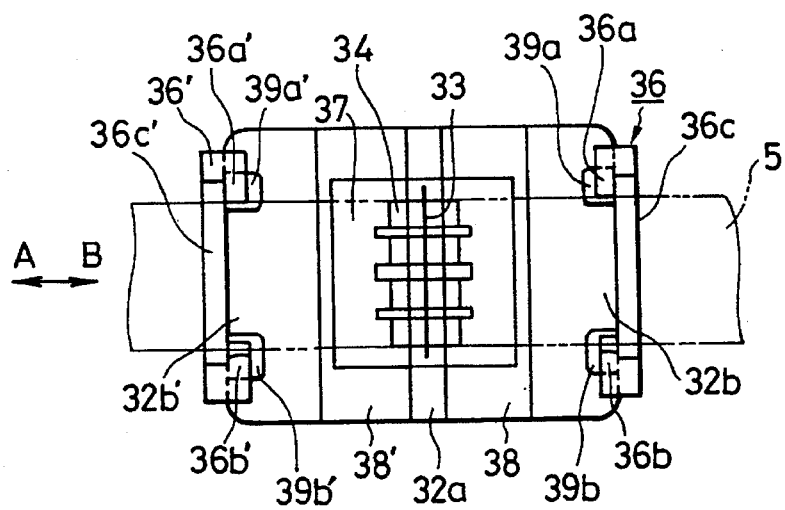
FIG. 14 is a top plan view of the magnetic head of FIG. 13.
Figure 15:
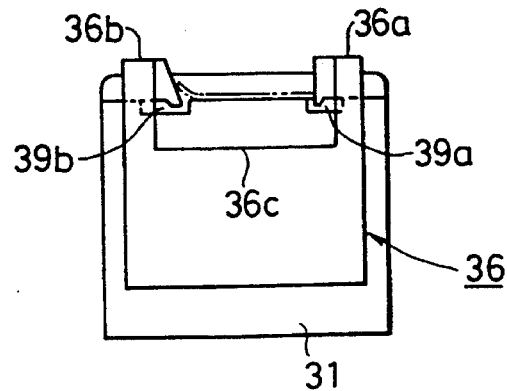
FIG. 15 is a side view of the magnetic head of FIGS. 13 and 14.

Next when the magnetic tape 5 is traveling in the direction indicated by the arrow A in FIG. 14, the magnetic tape initially makes contact with the tape travel surface 32b on the side of the tape guide. Under this condition, a portion of the tape travel surface 32b which comes into contact with the magnetic tape 5 is located between the inclined plane of the projection 36b and the reference plane of the projection 36a. As a result, the travel direction and the travel position can be correctly controlled by the inclined plane of the projection 36b and the reference plane of the projection 36a.

Figure 13:
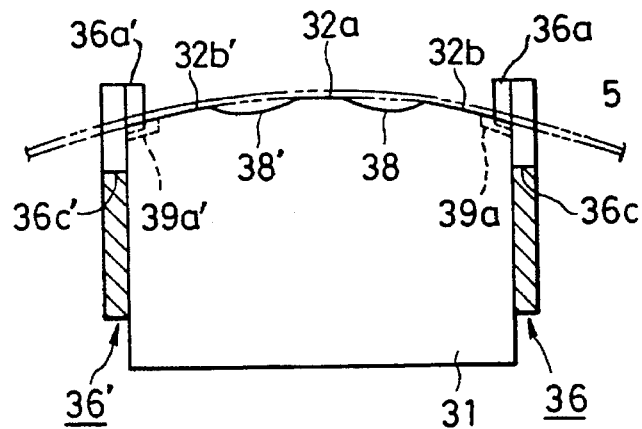
FIG. 13 is a cross-sectional view taken along the passage of the traveling magnetic tape illustrating a second embodiment of a magnetic head in accordance with the present invention.

As best shown in FIG. 13, the bottom plane 36c and 36c' of the tape guides 36 and 36', respectively are not located so as to interfere the traveling of the magnetic tape 5 so that dust particles due to contact between the magnetic tape 5 and the bottom planes 36c and 36c' can be prevented from being produced. Furthermore, the tape travel surface 32b is defined over the top surface of the case 31 as in the case of the first embodiment and its modification described above, and the case 31 is made of a metal. In addition, the surfaces of the case 31 are finished very smoothly. As a result, the production of dust particles such as magnetic particles and binder particles at the tape travel surface 32b can be substantially eliminated so that unlike the conventional magnetic heads, no dust accumulates or adhered to the surface in the vicinity of the magnetic gap 33.

The same is true for the case in which the magnetic tape 5 is traveling in the direction indicated by the arrow B in FIG. 14 so that there is no danger that the production of dust particles such as magnetic particles and binder particles resulting from the traveling of the magnetic tape will occur.

MODIFICATION OF THE SECOND EMBODIMENT

Figure 16:
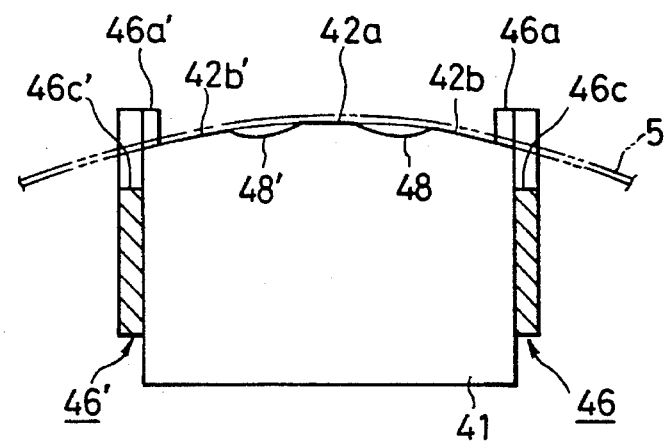
FIG. 16 is a cross-sectional view, taken along the passage of the traveling magnetic tape illustrating a modification of the magnetic head of second embodiment shown in FIGS. 13–15.
Figure 17:
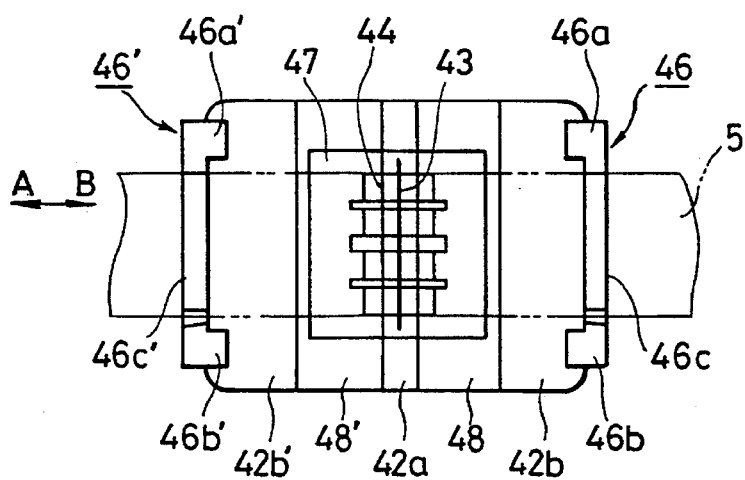
FIG. 17 is a top plan view of the magnetic head of FIG. 16.
Figure 18:
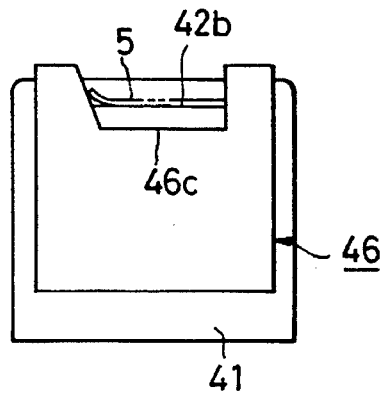
FIG. 18 is a side view of the magnetic head of FIGS. 16 and 17.

Next referring to FIGS. 16, 17 and 18, the modification of the second embodiment of a magnetic head in accordance with the present invention will be described in detail hereinafter. Unlike the second embodiment described above, the modification of the second embodiment is not specially formed with recesses at both the side edges of the tape travel surface, but the radius of curvature of the overall tape travel surface is determined in a manner similar to the described above with reference to FIGS. 13–15 (the second embodiment). The positions of the bottom plane 46c and 46c' of the tape guides 46 and 46', respectively, are located so as not to interfere with the travel of the magnetic tape 5 while the magnetic tape 5 initially makes contact with the tape travel surface 42b or 42b'. Furthermore, the end surfaces including the ridgelines or profile lines of the side edges of the tape travel surfaces 42b and 42b' are come into close intimate contact with the side surfaces of the case 41. As a result, the profile lines on the sides of the guides of the tape travel surfaces 42b and 42b' are located very close to the reference planes defined by the projections 46a and 46a' and the inclined planes defined by the projections 46b and 46b'. More particularly, in the direction of travel of the magnetic tape 5, the tape travel surfaces 42b and 42b' on the side of the tape guide becomes continuous with the reference planes defined by the projection 46a and 46a' and the inclined planes defined by the projections 46b and 46b', respectively. Thus, like the second embodiment described above with reference to FIGS. 13–15, the direction and position of travel of the magnetic tape 5 can be correctly controlled.

When the tape travel surfaces 42b and 42b' on the sides of the tape guides are continuous with or merge with the reference planes defined by the projections 46a and 46a' and the inclined planes defined by the projections 46b and 46b', like the second embodiment described above with reference to FIGS. 13–15, the position and direction of travel of the magnetic tape 5 can be correctly controlled.

When the tape travel surfaces 42b and 42b' on the sides of the tape guides, respectively, merge with the reference planes defined by the projections 46a and 46a' and the inclined planes defined by the projections 46b and 46b', they cannot be defined as strictly continuous when the spaces required for the thickness of the adhesive between the tape guides 46 and 46' and the case 41 are taken into consideration, but the discontinuity between them may be tolerated as long as the effects described above are not reduced.

THIRD EMBODIMENT

Figure 19:
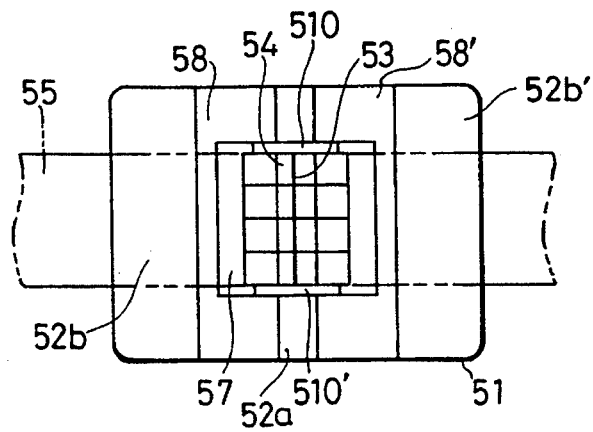
FIG. 19 is a top plan view of a third embodiment of a magnetic head in accordance with the present invention.
Figure 20:
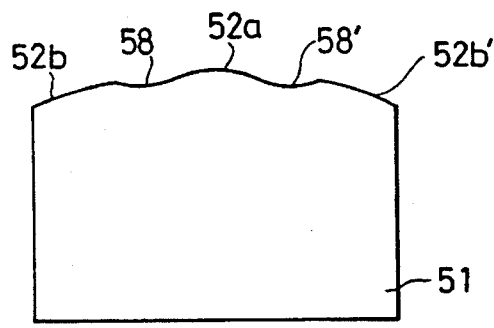
FIG. 20 is a front view of the magnetic head of FIG. 19.

Referring next to the FIGS. 19, 20 and 21, the third embodiment of a magnetic head in accordance with the present invention will be described. First the third embodiment is formed with grooves 510 and 510' at the tape travel surface 52a defined by the resin 57 so that contact of the magnetic tape 5 and the resin 57 is avoided.

These grooves 510 and 510' will be described in detail below. The distance between the inner side surfaces of the grooves 510 and 510' is made smaller than the width of the magnetic core 54 (which is, for example, 3.72±0.05 mm) and furthermore no resin 57 remains at the end faces of the core 54 along the boundary between the core 54 and the resin 57.

The width of the grooves 510 and 510' is the order of 0.2 mm and the size of the grooves 510 and 510' is so determined that both of the side edges of the magnetic tape 5 may be located within the recesses 510 and 510' and is preferably reduced as small as possible so that the edges of the magnetic tape 5 will not make contact with the resin 57 located outwardly of the recesses or grooves 510 and 510'. When the width of the recesses 510 and 510' is in excess of 1 mm, a portion of a pad (not shown) which presses against the tape travel surface 52a from the upper side of the core 54 falls into the recesses 510 and 510' so that the magnetic tape 5 is bent within the recesses 510 and 510'. As a result, there occur various problems that the writing and reading characteristics are degraded due to the failure of correct determination of the azimuth and that the side edges of the magnetic tape 5 are twisted, causing damage to the magnetic tape 5.

The depth of the recesses 510 and 510' is so determined that a shorter length of the edges of the magnetic tape 5 remains within the recesses 510 and 510', for instance, even when the magnetic tape 55 is pressed by the pad (of the type described above), so that contact with the bottoms of the recesses 510 and 510' will not be made.

With the magnetic head with the above-described construction, the contact of the magnetic tape 5 with some portions of the resin 57 located on both sides of the magnetic core 54 can be prevented so that separation and adhesion of dust particles at these portions can be avoided.

Figure 22:
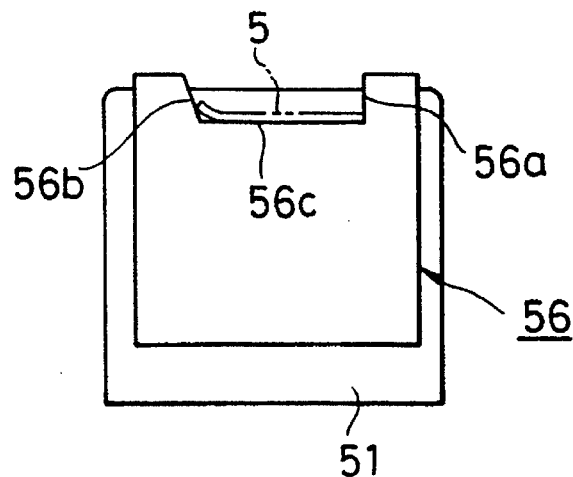
FIG. 22 is a side view illustrating the magnetic head shown in FIG. 19 having tape guides.
Figure 23:
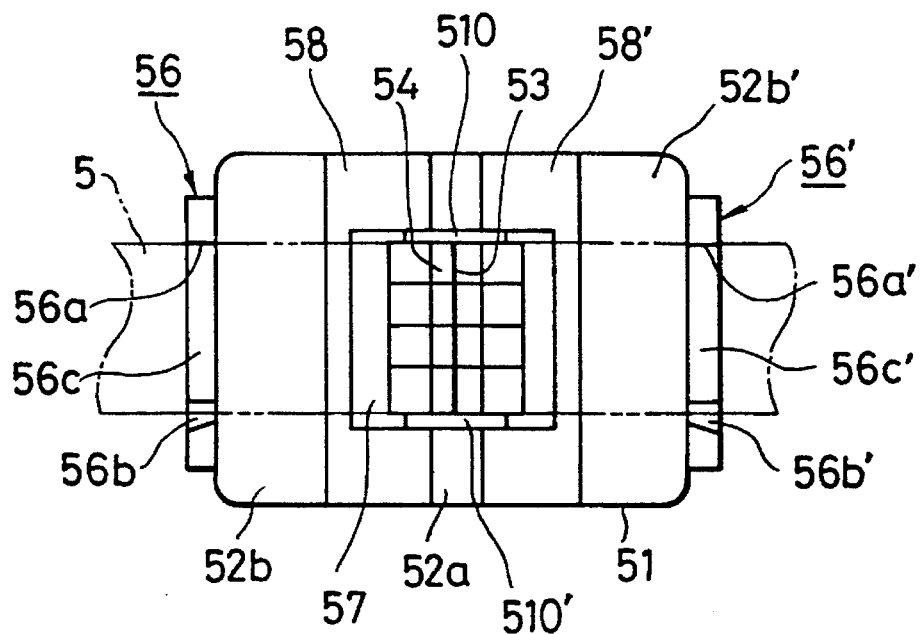
FIG. 23 is a top plan view of the magnetic head shown in FIG. 22.

When the third embodiment is provided with the tape guides 56 and 56' as shown in FIGS. 22 and 23, more advantageous effects can be attained.

FIGS. 22 and 23 illustrate the third embodiment provided with tape guides 56 and 56'. First, the function of the tape guides 56 and 56' will be described. The magnetic tape 5 is pressed against the bottom plane 56c of the tape guide 56 under the tension of the magnetic tape 5, and come into contact with the inclined plane defined by the projection 56b of the tape guide 56 and is biased toward the reference plane defined by the projection 56a of the tape guide 56. The reference plane is substantially perpendicular to the bottom plane 56c so that one side edge of the magnetic tape 5 is traveling along the reference surface. In this case, the reference plane is defined to substantially perpendicular to the magnetic gap 53 so that the position and direction of the traveling tape can always be maintained in a stabilized condition. The angle defined by the magnetic tape 5 and the magnetic gap 53 is also maintained in a stabilized condition so that the azimuth loss resulting from the difference in gap angle between the data writing mode and the data readout mode can be reduced to a minimum.

As described above, the tape guides 56 and 56' are in general formed by injection molding of a resin which is inexpensive, but their surfaces are somewhat rough. Therefore, when the magnetic tape 5 is pressed against the reference planes defined by the projections 56a and 56a' of the tape guides 56 and 56', separation of dust particles along one side edge of the magnetic tape 5 tends to occur frequently. As a result, in the case of the conventional magnetic head of the type described above, the dust particles produced from the side edges of the magnetic tape 5 adhere to the resin over the tape travel surface 52a in many cases, but the third embodiment is remarkably effective to satisfactorily prevent the dust particles from adhering the resin. More particularly, since the recesses are formed in some of the resin located on both sides of the core, the position and direction of the traveling tape in the modification of the third embodiment described above can be maintained in a stabilized state.

FOURTH EMBODIMENT

Next referring to FIGS. 24, 25 and 26, the fourth embodiment of a magnetic head in accordance with the present invention will be described. In the fourth embodiment, grooves or elongated recesses 611a, 611b, 611c and 611d are formed at the top surface of the head case 61 at which are defined the tape travel surfaces 62b and 62b' so that contact of both edges of the magnetic tape 5 with the tape travel surfaces 62b and 62b' is prevented.

The function of the recesses 611a, 611b, 611c and 611d will be described in detail below. First the distance between the inside surfaces of the recesses 611a and 611c and between the recesses 611b and 611d is made smaller than the width of the magnetic core 64 (3.72 ±0.05 mm). Then the dust particles especially those produced due to the contact of the edges of the magnetic tape 5 with the resin 67 which adhered to the edges of the tape 5 are carried to the tape travel surface 62a or 62b' but the dust particles will not adhere to the tape travel surfaces 62b and 62b'.

As described in the third embodiment, the depth of the recesses 611a, 611b, 611c and 611d is so determined that the edges of the magnetic tape 5 will not come into contact with the bottom of these recesses.

With the magnetic head of the type described above, the dust particles adhered to the side edges of the tape 5 can be prevented from adhering to the tape travel surface 62b or 62b' so that nonuniform wear of the head case 61 can be prevented.

MODIFICATION OF THE FOURTH EMBODIMENT

Figure 27:
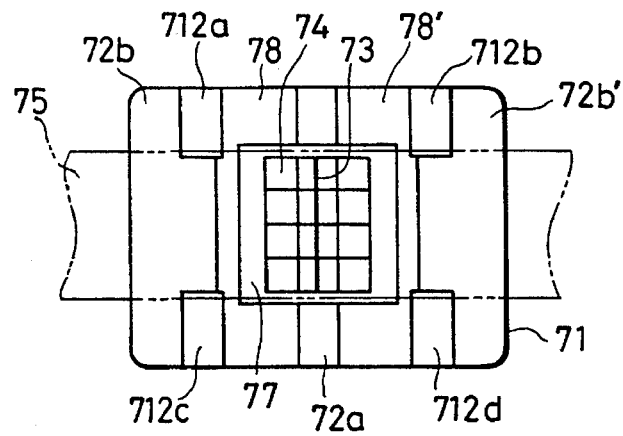
FIG. 27 is a top plan view illustrating a modification of the magnetic head of the fourth embodiment shown in FIGS. 24–26.
Figure 28:
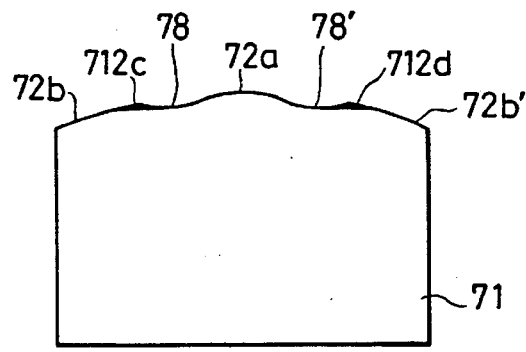
FIG. 28 is a front view of the magnetic head of FIG. 27.
Figure 29:
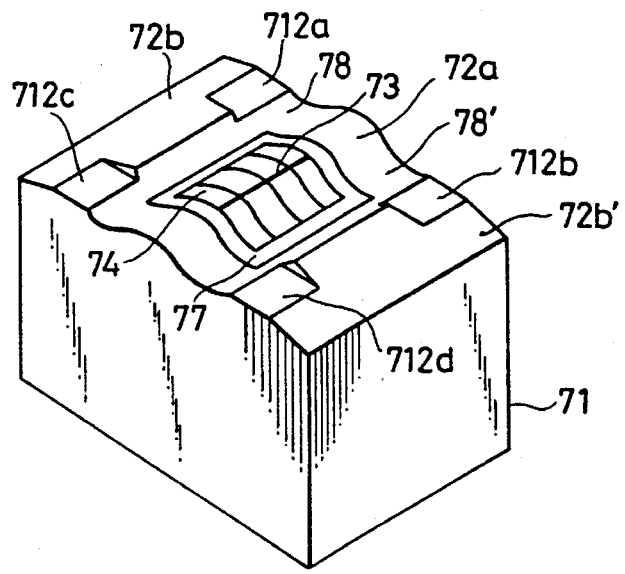
FIG. 29 is a perspective view of the magnetic head of FIGS. 27 and 28.

Referring now to FIGS. 27, 28 and 29, the modification of the fourth embodiment of a magnetic head in accordance with the present invention will be described. According to the fourth embodiment, recesses 712a, 712b, 172c and 712d are formed in such a manner that the inner distance between the opposing recesses 712a and 712c and between the opposing recesses 712b and 712d is slightly smaller than the width of the magnetic tape 5 and are formed over a portion of the tape travel surface of the head case 71 at which the tape travel surfaces 72b and 72b' are defined. Thus contact of the edges of the magnetic tape 5 with the tape travel surfaces 72b and 72b' can be prevented.

Figure 24:
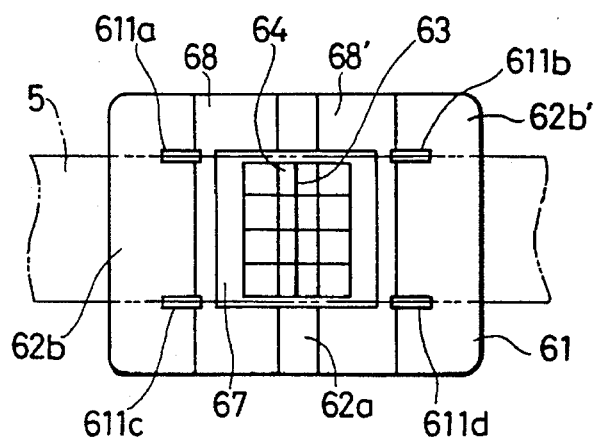
FIG. 24 is a top plan view of a fourth embodiment of a magnetic head in accordance with the present invention.
Figure 25:
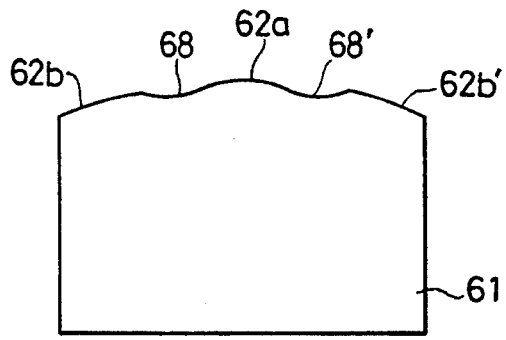
FIG. 25 is a front view of the magnetic head of FIG. 24.
Figure 26:
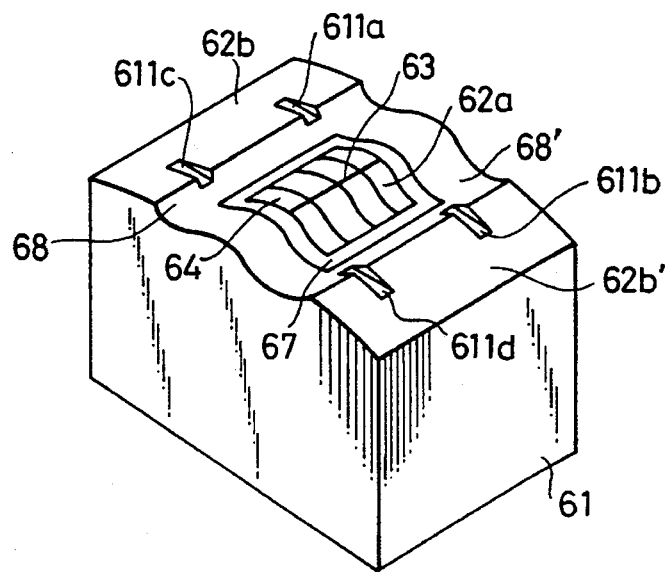
FIG. 26 is a perspective view of the magnetic head of FIGS. 24 and 25.

Therefore, like the fourth embodiment shown in FIGS. 24, 25 and 26 the magnetic head modified in the manner described above can be used for a long time at high temperatures without causing any adverse effects to the travel of the magnetic tape 5.

Moreover when the magnetic head of the fourth embodiment and its modification is provided with tape guides as will be described below with reference to FIGS. 30 and 31, it can even more remarkable effects.

Figure 30:
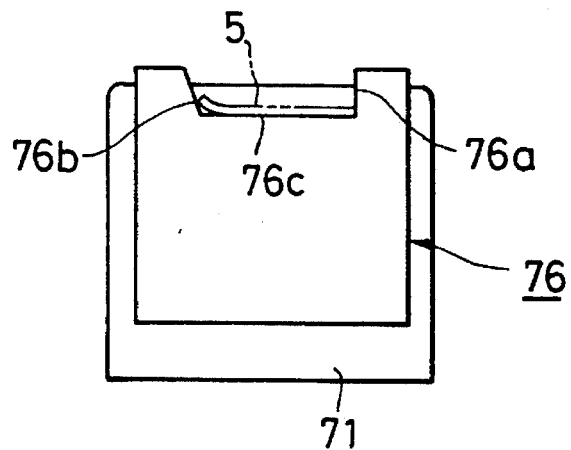
FIG. 30 is a side view illustrating the magnetic head shown FIG. 27 having tape guides.
Figure 31:
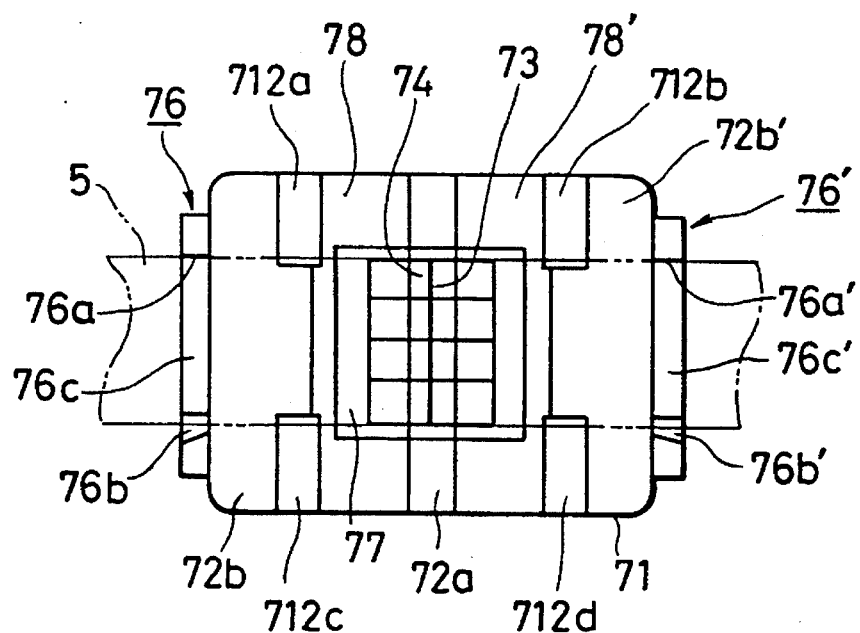
FIG. 31 is a top plan view of the magnetic head of FIGS. 27 to 30.

FIGS. 30 and 31 illustrate a magnetic head which is substantially similar in construction to the modification of the fourth embodiment described above with reference to FIGS. 27, 28 and 29 and which is further provided with tape guides.

As described above with reference to FIGS. 22 and 23, because of the formation of the recesses 712a and 712c or 712b and 712d the dust particles produced from the tape guides in opposing relationship with the edges of the magnetic tape can be prevented from adhering to the tape travel surface 72b or 72b'.

In the case of the fourth embodiment and its modification described above, when the longitudinal direction of the tape will be always maintained in a predetermined direction, it will be apparent to those skilled in the art that they may be formed at the downstream side of the traveling tape.

FIFTH EMBODIMENT

Figure 32:
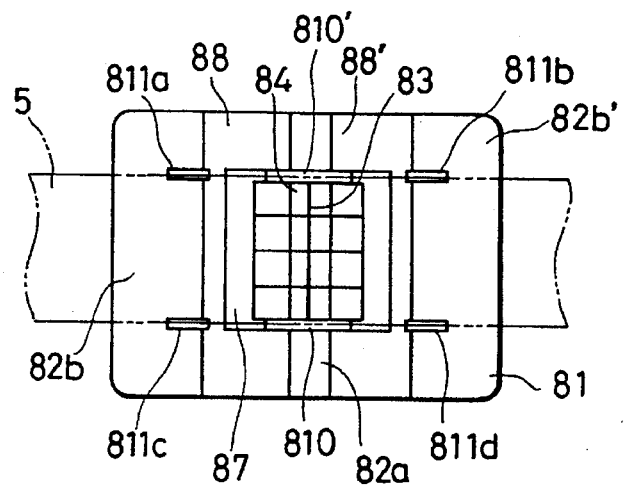
FIG. 32 is a top plan view illustrating a fifth embodiment of a magnetic head in accordance with the present invention.
Figure 33:
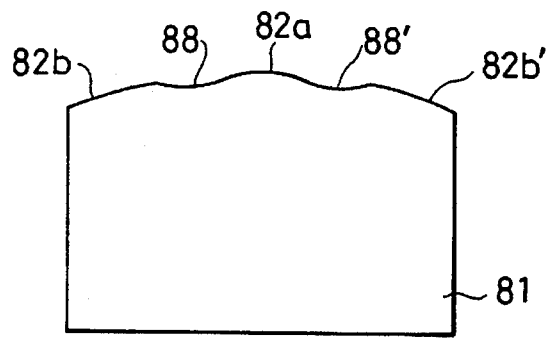
FIG. 33 is a front view of the magnetic head of FIG. 32.
Figure 34:
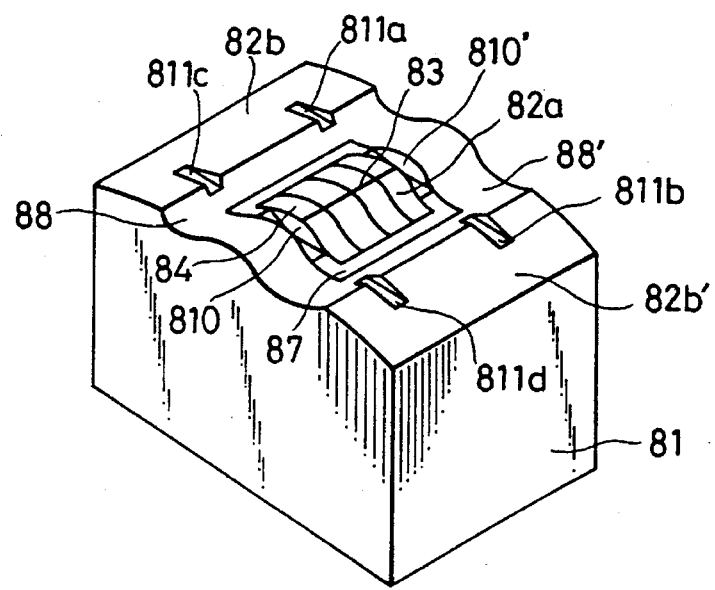
FIG. 34 is a perspective view of the magnetic head of FIGS. 32 and 33.

A fifth embodiment of a magnetic tape head illustrated in FIGS. 32, 33 and 34 is substantially similar in construction to the combination of the third and fourth embodiments. That is, recesses 810 and 810' are formed at the top surface of the resin 87 at which is defined the tape travel surface 82a so that contact of the magnetic tape 5 with the resin 87 can be prevented. Moreover when the recesses 811a, 811b, 811c and 811d are formed at the top surface of the case 81 at which are defined the tape travel surfaces 82b and 82b', the edges of the magnetic tape 5 can be prevented from making contact with the tape travel surfaces 82b and 82b' during the traveling of the tape.

MODIFICATION OF THE FIFTH EMBODIMENT

Figure 35:
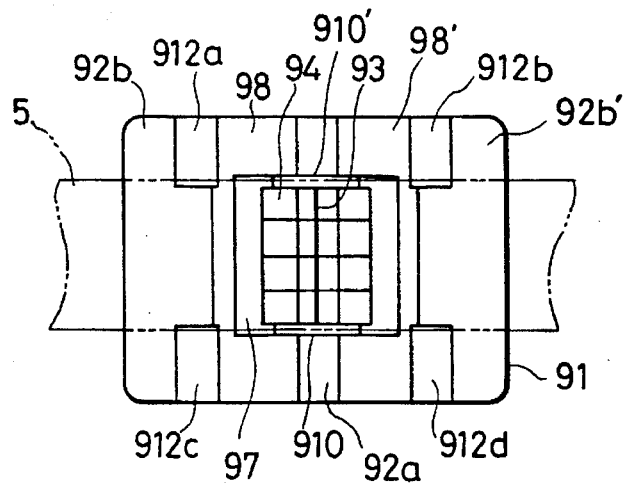
FIG. 35 is a top plan view illustrating a modification of the magnetic head of the fifth embodiment shown in FIGS. 32–34.
Figure 36:
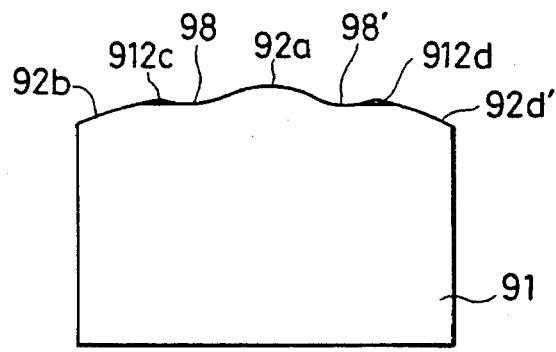
FIG. 36 is a front view of the magnetic head of FIG. 35.
Figure 37:
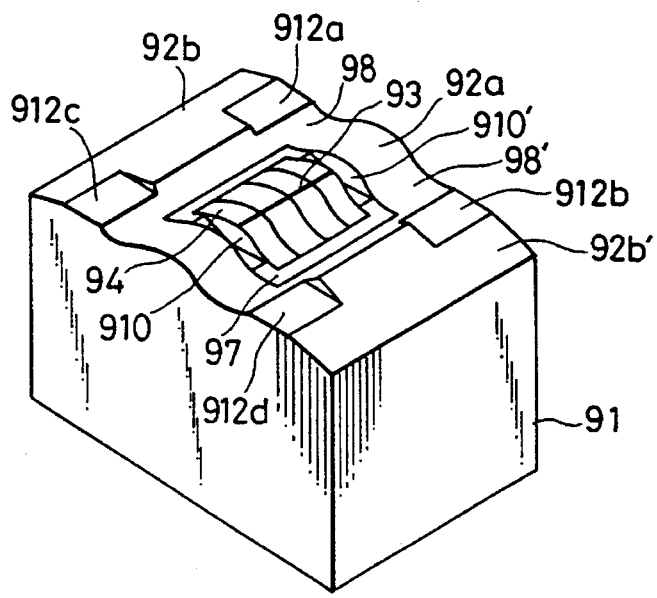
FIG. 37 is a perspective view of the magnetic head of FIGS. 35 and 36.

A modification of the fifth embodiment illustrated in FIGS. 35, 36 and 37 is substantially similar in construction to a combination of the modification of the third and fourth embodiments. That is, recesses 910 and 910' are formed at the tape travel surface 92a defined over the top surface of the resin 97 and recesses 912a, 912b, 912c and 912d are formed at the tape travel surfaces 92b and 92b' in such a way that the distance between the inner sides of the opposing recesses 912a and 912c and between the inner sides of the opposing recesses 912b and 912d is slightly narrower than the width of the magnetic tape 5.

Figure 38:
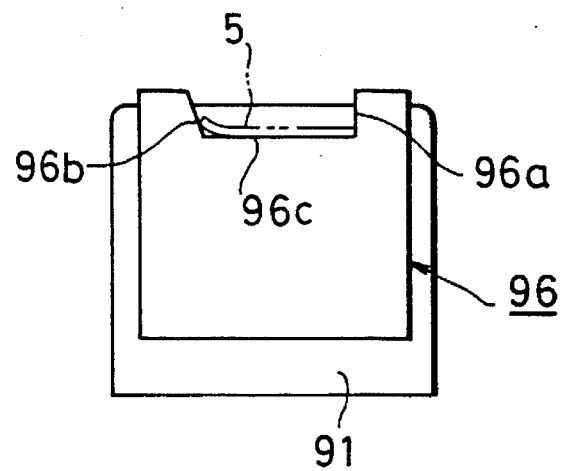
FIG. 38 is a side view illustrating the magnetic head shown in FIG. 35 having tape guides.
Figure 39:
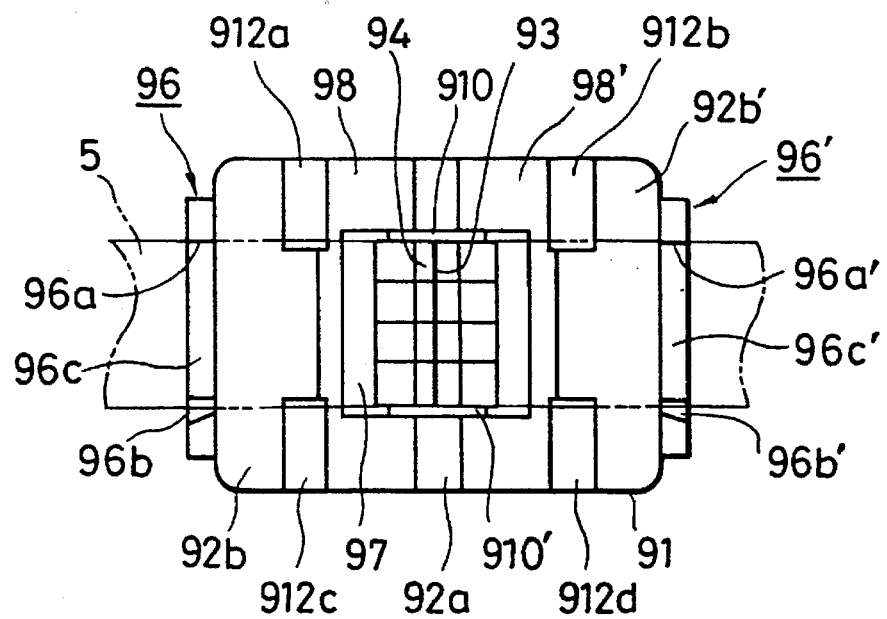
FIG. 39 is a top plan view of the magnetic head of FIGS. 35 to 38.

FIGS. 38 and 39 illustrate the magnetic tape being transported over the modified magnetic head described above with reference to FIGS. 35-37.

In the cases of the fifth embodiment and its modification with or without the tape guides, the production of dust particles can be reduced to a minimum and even when they are produced, they are almost completely prevented from adhering to the tape travel surfaces. Because of the synergetic effect obtained by the combination of a reduction in amount of dust particles and the prevention of the dust particles from adhering to the tape travel surfaces, as compared with the third and fourth embodiments and their modifications, the stabilized travel of the magnetic tape for a long period of time and the reading and writing characteristics at the magnetic gap can be satisfactorily maintained.

The invention has been described in detail with respect to the embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic head for writing and/or reading data into and/or from a magnetic tape comprising:

a magnetic core;

a case member for holding said magnetic core;

at least one tape guide being attached to said case member at an end thereof in a sliding direction of said magnetic tape and having projecting portions which are spaced apart from and disposed above said case member, one of said projecting portions having a surface defining a reference plane in contact with and determining a position of an edge of said magnetic tape, another of said projecting portions having a surface defining an inclined plane, disposed opposite said surface defining the reference plane, in contact with an opposite edge of said magnetic tape, for urging said magnetic tape to said surface defining the reference plane; and a tape slide surface on which said magnetic tape slides in contact therewith, said tape slide surface being defined by respective partial surfaces of said magnetic core and said case member, a section of the tape slide surface arranged between said surface defining the reference plane and said surface defining the inclined plane being defined by an upper surface of said case member, said section of the tape slide surface guiding said magnetic tape, and having at least one recess disposed in a part of said section of the slide surface and extending directly under said projecting portions.

2. A magnetic head as claimed in claim 1 further comprising:

a fixing member for fixing said magnetic core into said case member, said fixing member being made of a resin; and wherein the tape slide surface on which said magnetic tape slides in contact therewith is defined by respective partial surfaces of said magnetic core, said case member and said fixing member, said at least one recess including first and second recesses, said first and second recesses respectively extending in a longitudinal direction of said magnetic tape and being in alignment with each other.

3. A magnetic head as claimed in claim 1, wherein said section is arranged between a top of the projecting portion defining the inclined plane and a bottom of the projecting portion defining the inclined plane in a direction of a thickness of said magnetic tape.

4. A magnetic head for writing and/or reading data into and/or from a magnetic tape comprising:

a magnetic core;

a case member for holding said magnetic core;

tape guides provided at opposite ends of said case member in a sliding direction of said magnetic tape, each of said tape guides having a surface defining a reference plane in contact with and determining a position of an edge of said magnetic tape, a surface defining an inclined plane, disposed opposite said surface defining the reference plane, in contact with an opposite edge of said magnetic tape, for urging said magnetic tape to said surface defining the reference plane, and a connecting portion which connects said reference plane to said inclined plane, said connecting portion having an upward facing connecting surface that faces upward toward the magnetic tape, said upward facing connecting surface being disposed below a tape slide surface on which said magnetic tape slides in contact therewith, said connecting portion spaced from said magnetic tape; and wherein said tape slide surface on which said magnetic tape slides in contact therewith is defined by respective partial surfaces of said magnetic core and said case member, sections of the tape slide surface arranged directly between said surface defining the reference plane of each of said tape guides and said surface defining the inclined plane of each of said tape guides, being defined by the partial surfaces of said case member.

* * * * *